United States Patent
Chang et al.

(10) Patent No.: US 9,110,544 B2
(45) Date of Patent: Aug. 18, 2015

(54) TOUCH SENSING METHOD AND TOUCH SENSING APPARATUS OF CHARGE DISTRIBUTION TYPE

(75) Inventors: Yu-Cheng Chang, Taichung (TW); Ya-Nan Wen, Taipei (TW)

(73) Assignee: Nuvoton Technology Corporation, Hsinchu (TW)

( * ) Notice: Subject to any disclaimer, the term of this patent is extended or adjusted under 35 U.S.C. 154(b) by 604 days.

(21) Appl. No.: 13/474,721

(22) Filed: May 18, 2012

(65) Prior Publication Data

US 2013/0147759 A1 Jun. 13, 2013

(30) Foreign Application Priority Data

Dec. 9, 2011 (TW) .............................. 100145615 A (51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
None
See application file for complete search history.

(56) References Cited

U.S. PATENT DOCUMENTS

| | | |
|---|---|---|
| 6,452,514 B1 | 9/2002 | Philipp |
| 6,466,036 B1 | 10/2002 | Philipp |
| 6,583,676 B2 | 6/2003 | Krah et al. |
| 7,262,609 B2 | 8/2007 | Reynolds |
| 7,372,455 B2 | 5/2008 | Perski et al. |
| 7,417,441 B2 | 8/2008 | Reynolds |
| 2008/0162996 A1 | 7/2008 | Krah et al. |
| 2011/0012862 A1* | 1/2011 | Huang et al. ................. 345/174 |
| 2011/0084857 A1 | 4/2011 | Marino et al. |
| 2011/0163994 A1* | 7/2011 | Tang et al. ................... 345/174 |

FOREIGN PATENT DOCUMENTS

| | | |
|---|---|---|
| TW | 201101129 A | 1/2011 |
| TW | 201104538 | 2/2011 |
| TW | 201124895 A | 7/2011 |
| TW | 201135570 A | 10/2011 |

* cited by examiner

*Primary Examiner* — Kenneth B Lee, Jr.
(74) *Attorney, Agent, or Firm* — CKC & Partners Co., Ltd.

(57) ABSTRACT

A touch sensing method of charge distribution type is disclosed. Firstly, charges in a panel are removed. Next, a scanning signal is provided to scan a plurality of sensing regions of the panel. Subsequently, the panel is set in a first switching mode for charging the panel with the scanning signal. Thereafter, the panel is set in a second switching mode for modifying a distribution of charges injected into the panel. Next, an equivalent voltage is acquired after the charges are distributed at an equilibrium state. Furthermore, a touch sensing apparatus with charge distribution type is provided herein.

17 Claims, 9 Drawing Sheets

TOUCH SENSING METHOD AND TOUCH SENSING APPARATUS OF CHARGE DISTRIBUTION TYPE

RELATED APPLICATIONS

This application claims priority to Taiwan Application Serial Number 100145615, filed Dec. 9, 2011, which is herein incorporated by reference.

BACKGROUND

1. Technical Field

The present disclosure relates to a touch sensing method and a touch sensing apparatus, and more particularly, to a touch sensing method and a touch sensing apparatus of charge distribution type.

2. Description of Related Art

Nowadays, more and more electronic products utilize a panel as an operational interface for allowing a user to input information with a finger or a touch pen. There are many types of touch sensing technologies applied in a touch panel. For example, the touch position of the finger or touch pen on a capacitive panel is determined by detecting the variation of charges in sensing capacitors. Besides, the capacitive panel has a better transmittance and is less likely to be damaged, and thus is widely applied in various electronic products.

However, a sensing device in a conventional capacitive panel has to use a built-in high precision capacitor to measure a sensing capacitor in the panel. A better effect of voltage amplification can be achieved when the capacitances of the built-in high precision capacitor and the sensing capacitor are close to each other. Therefore, the sensing device needs several built-in high precision capacitors with different capacitances to measure unknown sensing capacitors in the panel. Alternatively, several times of integrations and complicated calculations have to be performed on the voltage measurement result of the sensing capacitor to obtain a better voltage output for determining the touch sensing regions.

Hence, the conventional skill still has the aforementioned shortcomings and deficiencies desired to be overcome.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

An aspect of the present disclosure relates to a touch sensing method with charge distribution. At first, charges in a panel are removed. Next, a scanning signal is provided to scan a plurality of sensing regions of the panel. Subsequently, the panel is set in a first switching mode for charging the panel with the scanning signal. Thereafter, the panel is set in a second switching mode for modifying a distribution of charges injected into the panel. Next, an equivalent voltage is acquired after the charges are distributed at an equilibrium state.

The other aspect of the present disclosure relates to a touch sensing apparatus of charge distribution type which includes a plurality of first axial electrodes, a plurality of second axial electrodes, a first axial switch unit, a second axial switch unit, a switch control unit, a measurement unit and a processing unit. The first axial electrodes are disposed in a panel. The second axial electrodes are disposed in the panel, and the second axial electrodes are interlaced or interleaved with the first axial electrodes to form a plurality of sensing regions. The first axial switch unit is electrically coupled with the first axial electrodes. The second axial switch unit is electrically coupled with the second axial electrodes. The switch control unit is electrically coupled between the first axial switch unit and the second axial switch unit and configured to control switching modes of the first axial switch unit and the second axial switch unit, such that the charges are injected into and distributed in the panel according to a scanning signal. The measurement unit is electrically coupled with the first axial switch unit to acquire an equivalent voltage after the charges are distributed at an equilibrium state. The processing unit electrically is coupled with the measurement unit and the switch control unit, and is configured to determine whether an object is in contact with or close to the panel according to the variation of the equivalent voltage acquired by the measurement unit.

BRIEF DESCRIPTION OF THE DRAWINGS

The present invention can be more fully understood by reading the following detailed description of the embodiments, with reference made to the accompanying drawings as follows.

DETAILED DESCRIPTION

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a," "an," and "the" includes reference to the plural unless the context clearly dictates otherwise. Also, as used in the description herein and throughout the claims that follow, the terms "comprise or comprising," "include or including," "have or having," "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
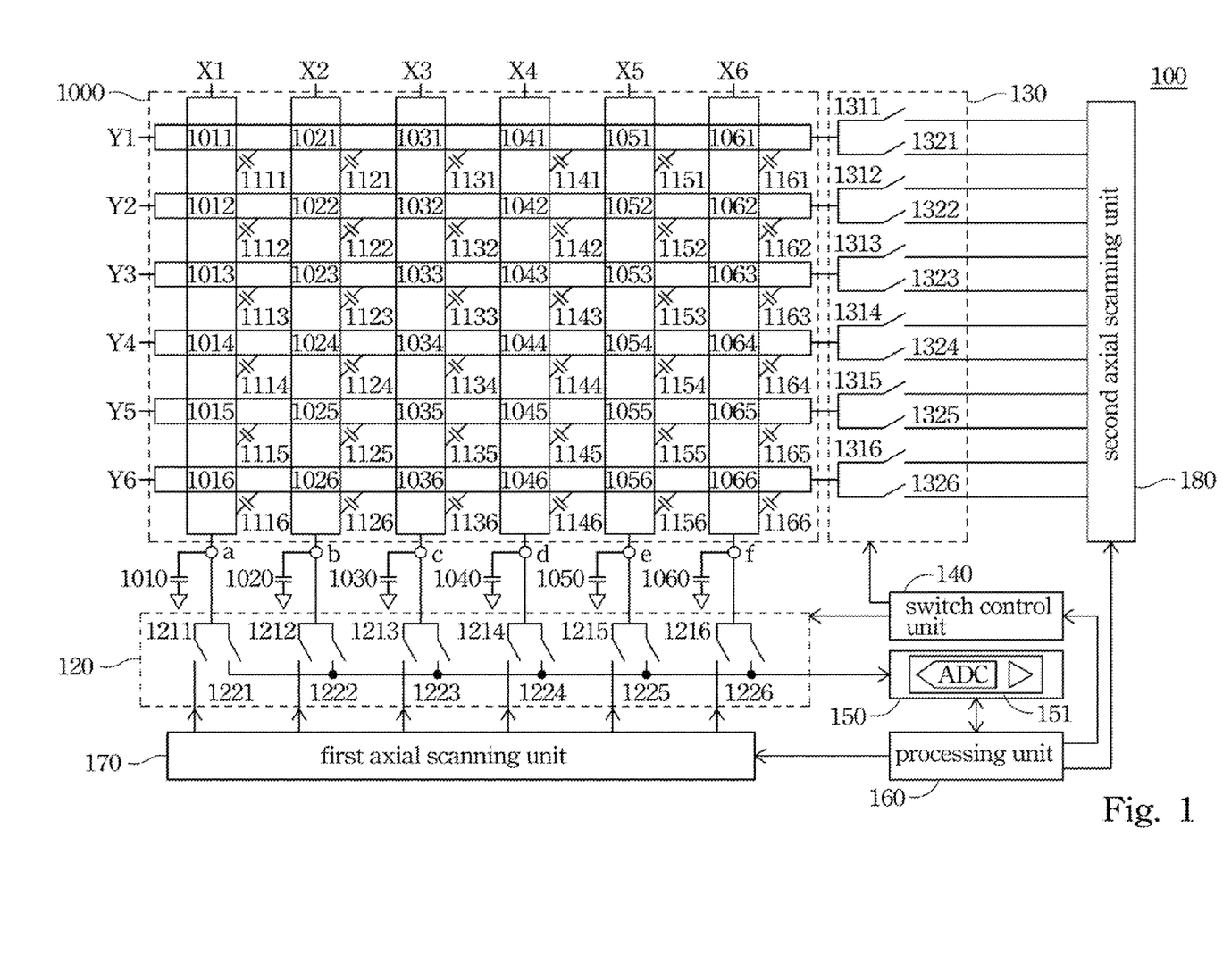
FIG. 1 is a circuit block diagram showing a touch sensing apparatus of charge distribution type according to an embodiment of the present disclosure.

FIG. 1 is a circuit block diagram of a touch sensing apparatus 100 of charge distribution type according to an embodiment of the present disclosure. The touch sensing apparatus 100 includes first axial electrodes X1-X6, second axial electrodes Y1-Y6, a first axial switch unit 120, a second axial switch unit 130, a switch control unit 140, a measurement unit 150 and a processing unit 160. The first axial electrodes X1-X6 are disposed in a panel 1000. The second axial electrodes Y1-Y6 are disposed in the panel 1000 and interlaced with the first axial electrodes X1-X6 to form a plurality of sensing regions, e.g., sensing regions 1011-1016, sensing regions 1021-1026, sensing regions 1031-1036, sensing regions 1041-1046, sensing regions 1051-1056 and sensing regions 1061-1066. In addition, the second axial electrodes Y1-Y6 also can be interleaved with the first axial electrodes X1-X6 to form a plurality of sensing regions.

The first axial switch unit 120 is electrically coupled with the first axial electrodes X1-X6. The second axial switch unit 130 is electrically coupled with the second axial electrodes Y1-Y6. The switch control unit 140 is electrically coupled with the first axial switch unit 120 and the second axial switch unit 130, and is configured to control switching modes of the first axial switch unit 120 and the second axial switch unit 130, such that the charges are injected into and distributed in the panel 1000 according to a first axial scanning signal (or referred to as X-axis scanning signal) and a second axial scanning signal (or referred to as Y-axis scanning signal). The measurement unit 150 is electrically coupled with the first axial switch unit 120 to acquire an equivalent voltage after the charges are distributed at an equilibrium state. The processing unit 160 is electrically coupled with the measurement unit 150 and the switch control unit 140, and determines whether an object (e.g., a finger or a touch pen) is in contact with or close to the panel 1000 according to the variation of the equivalent voltage acquired by the measurement unit 150. Illustratively, a voltage distribution diagram of the entire panel 1000 may be generated by the processing unit 160 according to the aforementioned equivalent voltage, so as to determine whether the object is in contact or close to the sensing regions of the panel 1000.

In one embodiment of the present disclosure, the panel 1000 may be a touch panel (in which the touch panel may be adhered to or be combined in other ways with a display panel or other elements to construct a touch control device), and the first axial electrodes X1-X6 are disposed on an outer or inner surface of a glass substrate of the touch panel, and the second axial electrodes Y1-Y6 are disposed on the outer or inner surface of the glass substrate of the touch panel. In other words, the first axial electrodes X1-X6 and the second axial electrodes Y1-Y6 may be disposed on the same surface or different surfaces of the glass substrate of the touch panel, respectively.

In another embodiment, the panel 1000 may be a display panel, and the first axial electrodes X1-X6 are located in the display panel or on a surface of the display panel, and the second axial electrodes are located in the display panel or on the surface of the display panel.

It is noted that the foregoing dispositions of the axial electrodes for the touch panel or the display panel are merely shown as embodiments of the present invention and the present invention is not limited thereto.

In one embodiment of the present disclosure, each sensing region has a corresponding sensing capacitor. For example, the sensing region 1011 has a corresponding sensing capacitor 1111, and the sensing region 1012 has a corresponding sensing capacitor 1112, and so forth.

The disposition or arrangement of the first axial electrodes X1-X6 and the second axial electrodes Y1-Y6, as shown in FIG. 1, is merely one embodiment of the present disclosure. In another embodiment of the present disclosure, the first axial electrodes X1-X6 and the second axial electrodes Y1-Y6 can also be interdigitally arranged on a same plane; for example, the first axial electrodes X1-X6 are interleaved with the second axial electrodes Y1-Y6 to form a plurality of sensing regions. Therefore, the dispositions or arrangements of the first axial electrodes X1-X6 and the second axial electrodes Y1-Y6 mentioned above are illustrative of the present disclosure rather than limiting of the present disclosure, and it is intended to cover various modifications and similar arrangements included within the spirit and scope of the appended claims; in other words, any disposition or arrangement in which sensing capacitances are formed between the first axial electrodes X1-X6 and the second axial electrodes Y1-Y6 is included within the spirit and scope of the appended claims.

In one embodiment of the present disclosure, the charge distribution type touch sensing apparatus 100 may further include a first axial scanning unit 170 and a second axial scanning unit 180. The first axial scanning unit 170 is electrically coupled with the first axial switch unit 120 and the processing unit 160, and is configured to generate the first axial scanning signal for sequentially driving the first axial electrodes X1-X6. The second axial scanning unit 180 is electrically coupled with the second axial switch unit 130 and the processing unit 160, and is configured to generate the second axial scanning signal for sequentially driving the second axial electrodes Y1-Y6.

In one embodiment of the present disclosure, the first axial switch unit 120 and the second axial switch unit 130 respectively include a first switch group and a second switch group. For example, the first switch group of the first axial switch unit 120 includes switches 1211-1216, and the second switch group of the first axial switch unit 120 includes switches 1221-1226. The first switch group of the second axial switch unit 130 includes switches 1311-1316, and the second switch group of the second axial switch unit 130 includes switches 1321-1326.

The first switch group (the switches 1211-1216) of the first axial switch unit 120 is electrically coupled between the first axial electrodes X1-X6 and the first axial scanning unit 170, and the second switch group (the switches 1221-1226) of the first axial switch unit 120 is electrically coupled between the first axial electrodes X1-X6 and the measurement unit 150.

Additionally, the first switch group (the switches 1311-1316) and the second switch group (the switches 1321-1326) of the second axial switch unit 130 are electrically coupled between the second axial electrodes Y1-Y6 and the second axial scanning unit 180.

In one embodiment of the present disclosure, the measurement unit 150 may include an operation module 151. The operation module 151 may be an analog-to-digital converter (A/D Converter; ADC) or a charge integrator, which is configured to acquire the equivalent voltage after the charges are distributed at the equilibrium state, thereby converting the equivalent voltage to a digital signal for the processing unit 160 to perform calculations and determinations.

Figure 2A:
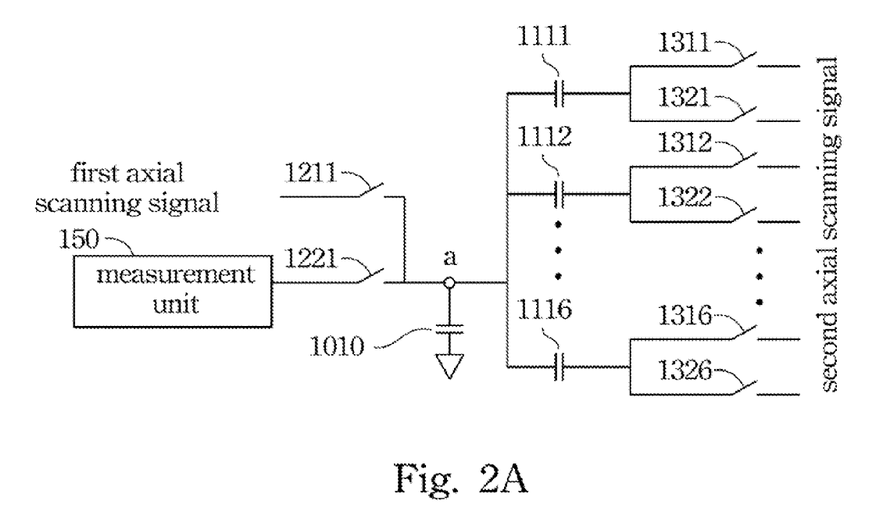
FIG. 2A is a fragmentary circuit diagram of the touch sensing apparatus shown in FIG. 1.

FIG. 2A is a fragmentary circuit diagram of the touch sensing apparatus shown in FIG. 1. Referring to both FIG. 1 and FIG. 2A, when the sensing region 1011 of the panel 1000 is scanned, the first axial scanning unit 170 provides the first axial scanning signal to the switches 1211-1216. At the same time, the second axial scanning unit 180 provides the second axial scanning signal to the switches 1311-1316 and the switches 1321-1326. Illustratively, the sensing region 1011 formed by the first axial electrode X1 interlacing with the second axial electrode Y1 has the corresponding sensing capacitor 1111. Similarly, the sensing regions 1012-1016 formed by the first axial electrode X1 interlacing with the second axial electrodes Y2-Y6 have the corresponding sensing capacitors 1112-1116, respectively. Additionally, when the first axial scanning signal and the second axial scanning signal are provided as described above, a parasitic capacitance effect of the fragmentary circuit of the panel 1000 is represented by an equivalent parasitic capacitor on a node a.

Figure 2B:
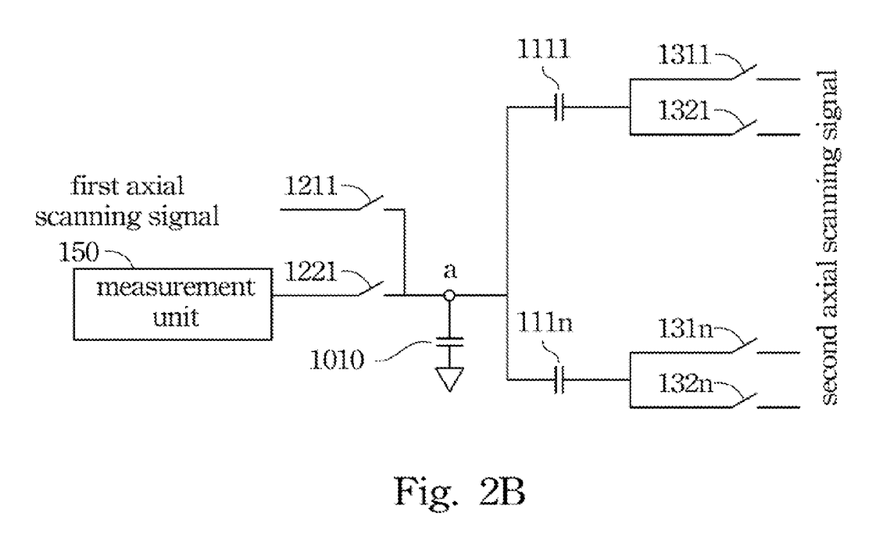
FIG. 2B is a fragmentary equivalent circuit diagram of the touch sensing apparatus shown in FIG. 2A.

FIG. 2B is a fragmentary equivalent circuit diagram of the touch sensing apparatus in FIG. 2A. In other words, the sensing capacitors 1112-1116 of the sensing regions 1012-1016 which are not scanned may be represented by an equivalent sensing capacitor 111n, and the switches 1312-1316 may be represented as an equivalent switch 131n, and the switches 1322-1326 may be represented as an equivalent switch 132n.

Figure 3:
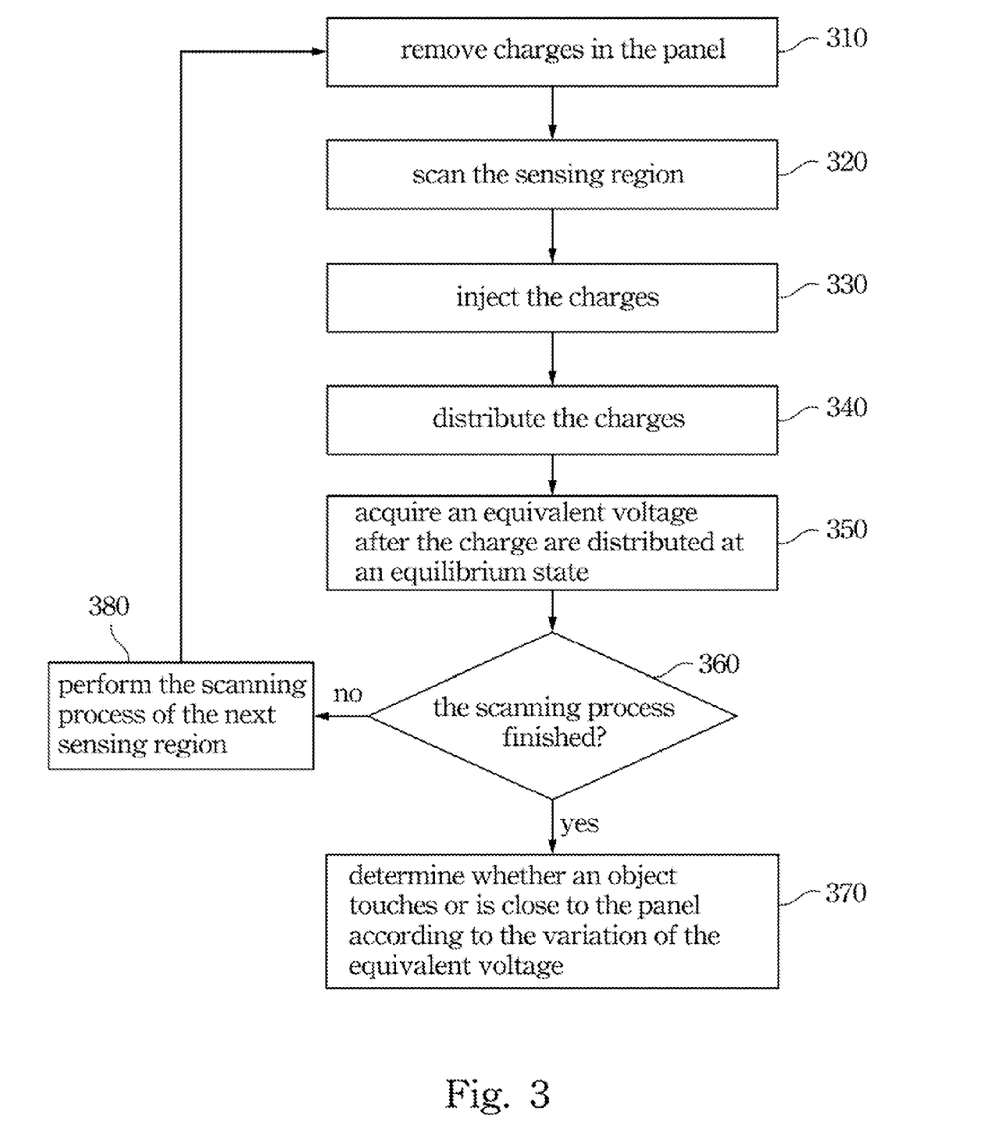
FIG. 3 is a flow chart showing a touch sensing method of charge distribution type according to an embodiment of the present disclosure.

FIG. 3 is a flow chart showing a touch sensing method of charge distribution type according to an embodiment of the present disclosure. In the present embodiment, the touch sensing method of charge distribution type may be performed by the touch sensing apparatus 100 shown in FIG. 1, wherein the fragmentary circuit thereof is identical or similar to those shown in FIG. 2A and FIG. 2B, and the operation steps are described as follows. In step 310, charges in the panel 1000 are removed. Next, in step 320, scanning signals (e.g., the first axis scanning signal and the second axis scanning signal) are provided to scan the sensing regions (e.g., sensing regions 1011-1016, sensing regions 1021-1026, sensing regions 1031-1036, sensing regions 1041-1046, sensing regions 1051-1056, sensing regions 1061-1066) of the panel 1000. Subsequently, in step 330, the panel 1000 is set in a first switching mode for charging the panel 1000 with the scanning signals. Thereafter, in step 340, the panel 1000 is set in a second switching mode for distributing (or modifying a distribution of) the charges injected into the panel 1000. Next, in step 350, the equivalent voltage is acquired after the charges are distributed at the equilibrium state.

In one embodiment of the present disclosure, the touch sensing method of charge distribution type further includes the following operation steps. Step 360 is performed for determining whether a scanning of the sensing regions of the panel 1000 is completed to decide whether the acquired equivalent voltage is determined. When the step of scanning the sensing regions is completed, step 370 is performed for determining whether the object is in contact with or close to the panel 1000 according to the variation of the equivalent voltage. When the step of scanning the sensing regions is not completed, the scanning process for a next sensing region of the sensing regions is performed, as shown in step 380.

In one embodiment of the present disclosure, the scanning signal may include a plurality of voltage levels. For example, the first axial scanning signal and the second axial scanning signal may include a high level voltage Vdd, a low level voltage Gnd and a predetermined level voltage Vtx, provided with voltages of required levels for scanning the panel 1000.

In a first embodiment of the present disclosure, the charges are injected into and distributed in the panel 1000 in a first charge distribution mode according to the scanning signal. At that moment, the first axial scanning unit 170 may output the first axial scanning signal to provide the high level voltage Vdd to the switch 1211. The second axial scanning unit 180 may output the second axial scanning signal to provide the low level voltage Gnd to the switch 1311 and the equivalent switch 132n, to provide the high level voltage Vdd to the equivalent switch 131n and to provide the predetermined level voltage Vtx to the switch 1321.

Figure 4A:
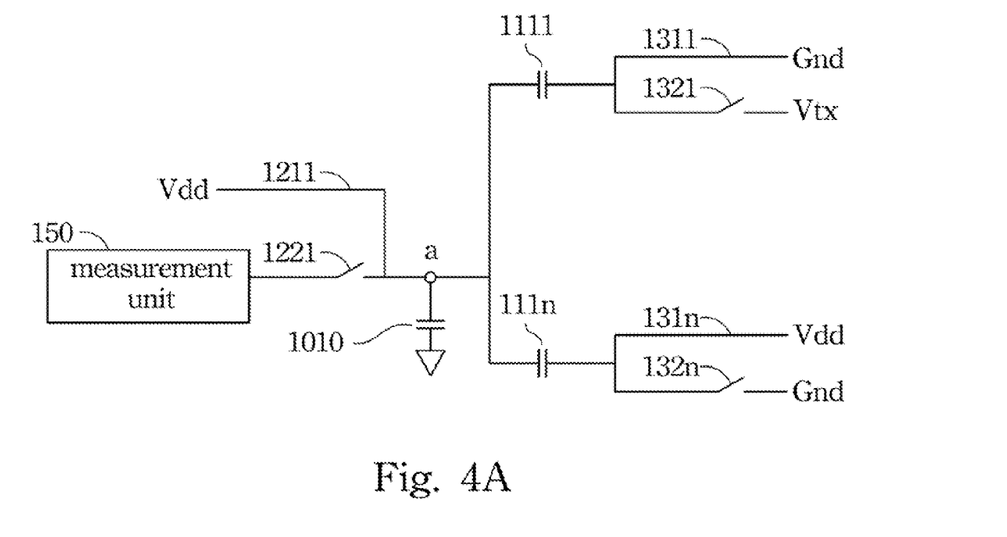
FIG. 4A is a fragmentary equivalent circuit diagram of the touch sensing apparatus which is disposed in the first switching mode in the first embodiment.

FIG. 4A is a fragmentary equivalent circuit diagram of the touch sensing apparatus of charge distribution type which is set in the first switching mode in the first embodiment. The scanning of the sensing region 1011 of the panel 1000 is taken as an example for illustration in accompany with FIG. 4A. When the panel 1000 is set in the first switching mode, the first switch group is set at an ON state, i.e., the switch 1211, the switch 1311 and the equivalent switch 131n are turned on, and the second switch group is set at an OFF state, i.e., the switch 1221, the switch 1321 and the equivalent switch 132n are turned off. Therefore, the high level voltage Vdd can be transferred through the switch 1211 to the sensing capacitor 1111 of the scanned sensing region 1011 and the equivalent parasitic capacitor 1010 of the panel 1000, such that the charges are injected into and stored in the sensing capacitor 1111 and the equivalent parasitic capacitor 1010.

Figure 4B:
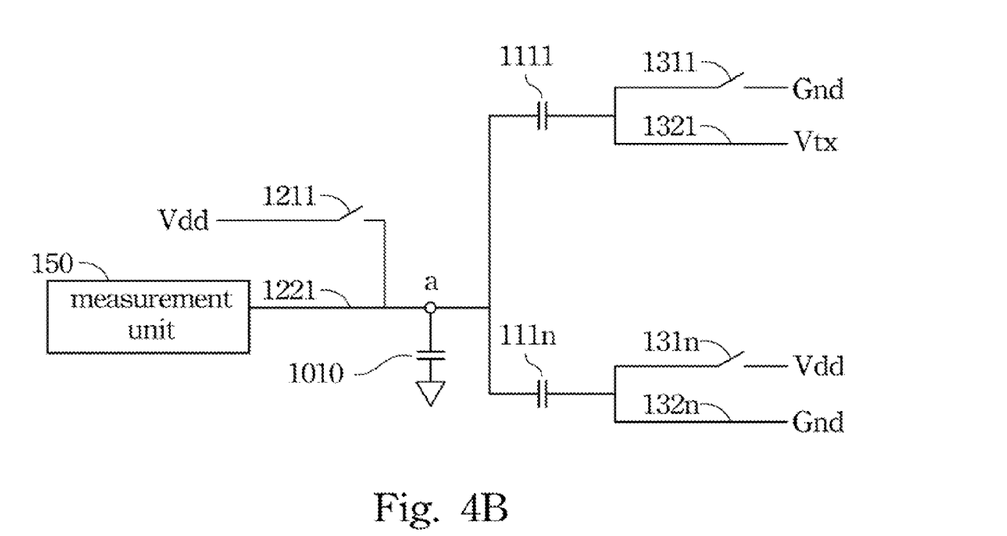
FIG. 4B is a fragmentary equivalent circuit diagram of the touch sensing apparatus which is disposed in the second switching mode in the first embodiment.

FIG. 4B is a fragmentary equivalent circuit diagram of the touch sensing apparatus of charge distribution type which is set in the second switching mode in the first embodiment. When the panel 1000 is set in the second switching mode, the first switch group is set at the OFF state, i.e., the switch 1211, the switch 1311 and the equivalent switch 131n are turned off, and the second switch group is set at the ON state, i.e., the switch 1221, the switch 1321 and the equivalent switch 132n are turned on. Therefore, the charges originally stored in the sensing capacitor 1111 and in the equivalent parasitic capacitor 1010 are redistributed in the sensing capacitor 1111, the equivalent parasitic capacitor 1010 and the equivalent sensing capacitor 111n of the sensing regions that are not scanned (e.g., the sensing regions 1012-1016), and the equivalent voltage may be acquired by the measurement unit 150 after the charges are distributed at the equilibrium state. The equivalent voltage can be calculated by the following formula:

$$V = \frac{Vdd * Cx1 + (Vtx + Vdd) * Cptx}{Cx1 + Cpn + Cptx},$$

where V is the equivalent voltage; Cx1 is the capacitance of the equivalent parasitic capacitor 1010; Vtx is the predetermined level voltage, Cptx is the capacitance of the sensing capacitor 1111; and Cpn is the capacitance of the equivalent sensing capacitor 111n.

Figure 5A:
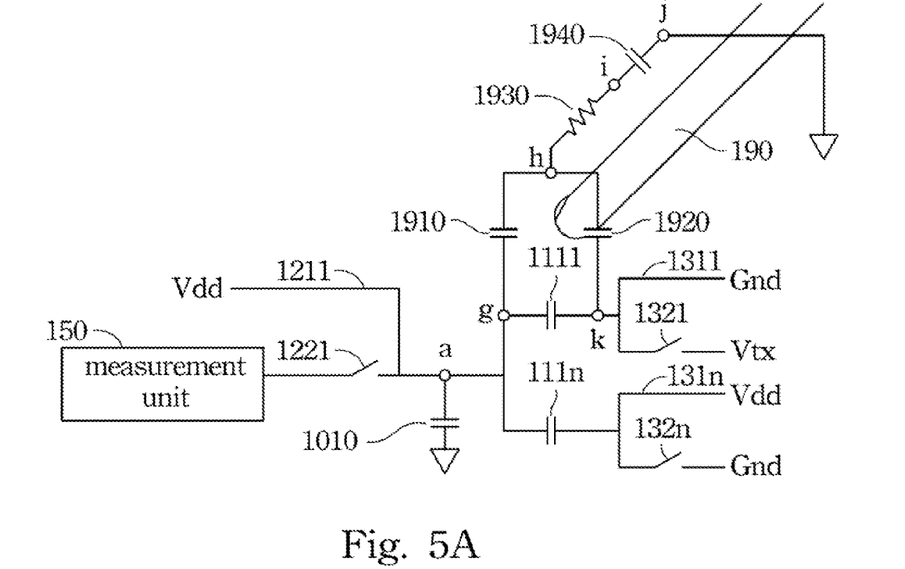
FIG. 5A is a fragmentary equivalent circuit diagram of the touch sensing apparatus of charge distribution type which is set in the first switching mode when an object touches the scanned sensing regions of the first embodiment.

FIG. 5A is a fragmentary equivalent circuit diagram of the touch sensing apparatus of charge distribution type which is set in the first switching mode when an object 190 touches the scanned sensing regions of the first embodiment. When the object 190 is in contact with or close to the sensing region 1011, a plurality of sensing paths are formed between the object 190 and the panel 1000 such that paths for the charges being injected are changed. For example, a first sensing path is formed between a node g and a node h; a second sensing path is formed between the node h and a node k; and a third sensing path is formed between the node h and a node j. Since the aforementioned three sensing paths additionally provide a first external sensing capacitor 1910, a second external sensing capacitor 1920 and an object equivalent capacitor 1940, the charges are also injected into the first external sensing capacitor 1910, the second external sensing capacitor 1920 and the object equivalent capacitor 1940.

Figure 5B:
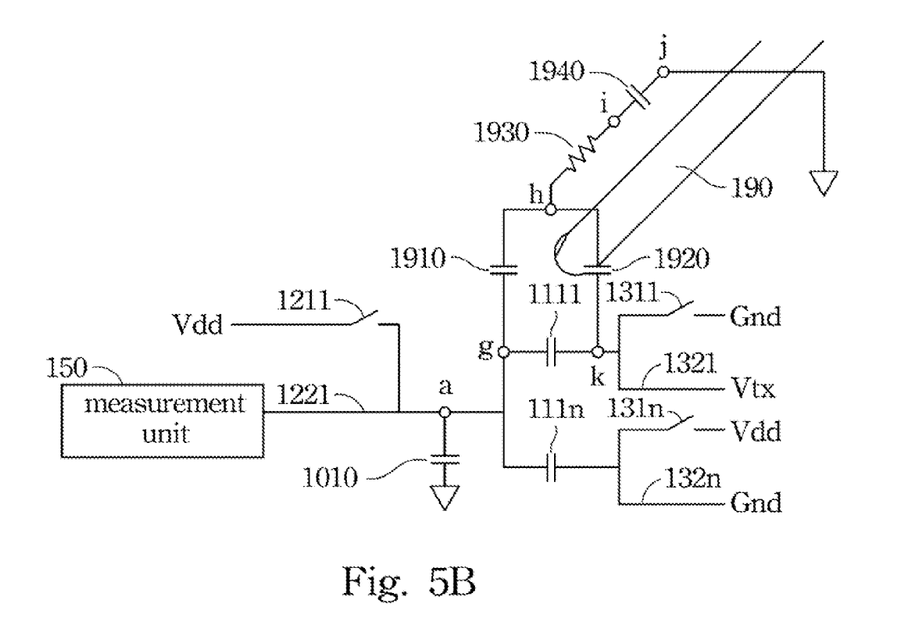
FIG. 5B is a fragmentary equivalent circuit diagram of the touch sensing apparatus of charge distribution type which is set in the second switching mode when the object touches the scanned sensing regions of the first embodiment.

FIG. 5B is a fragmentary equivalent circuit diagram of the touch sensing apparatus of charge distribution type which is set in the second switching mode when the object 190 touches the scanned sensing regions of the first embodiment. In the second switching mode, three sensing paths which are identical or similar to the three sensing paths in FIG. 5A are also formed between the object 190 and the panel 1000. Thus, the injected charges in FIG. 5A are redistributed in the aforementioned sensing paths, the sensing capacitor 1111, the equivalent parasitic capacitor 1010 and the equivalent sensing capacitor 111n according to the second switching mode, such that after the charges are redistributed at the equilibrium state, the equivalent voltage is less than the equivalent voltage under the condition that the sensing region 1011 is not touched by the object 190.

When the object 190 touches the sensing region 1011, the aforementioned equivalent voltage under the condition that the charges are redistributed at the equilibrium state can be calculated by the following formula:

$$V = \frac{Vdd * (Cx1 + Cxf) + (Vtx + Vdd) * (Cptx + Cptxf)}{(Cx1 + Cxf) + Cpn + (Cptx + Cptxf)},$$

where V is the equivalent voltage; Cx1 is the capacitance of the equivalent parasitic capacitor 1010; Vtx is the predetermined level voltage, Cptx is the capacitance of the sensing capacitor 1111; Cpn is the capacitance of the equivalent sensing capacitor 111n; and Cxf and Cptxf are the capacitances of the external sensing capacitors produced between the object 190 and the panel 1000.

Figure 6A:
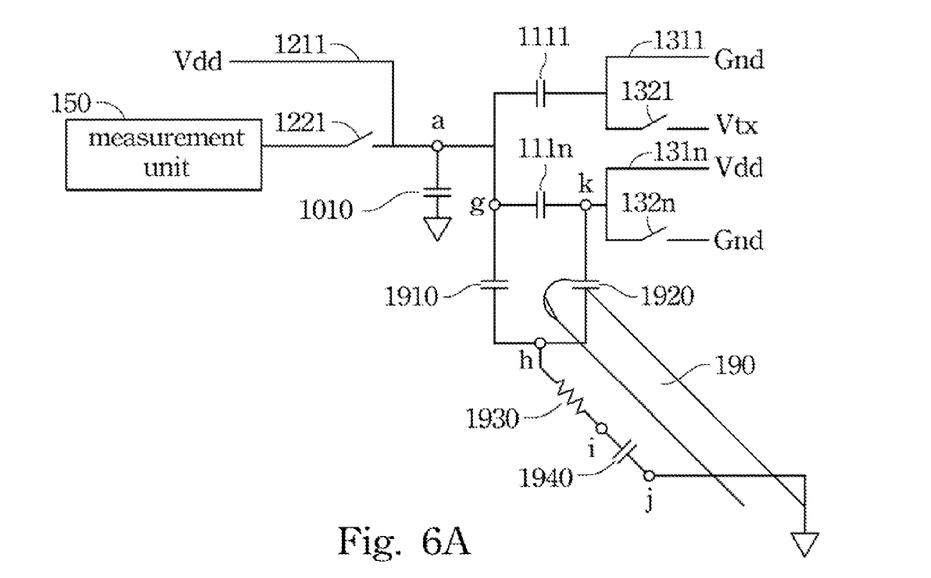
FIG. 6A is a fragmentary equivalent circuit diagram of the touch sensing apparatus of charge distribution type which is set in the first switching mode when the object touches the sensing regions that are not scanned of the first embodiment.
Figure 6B:
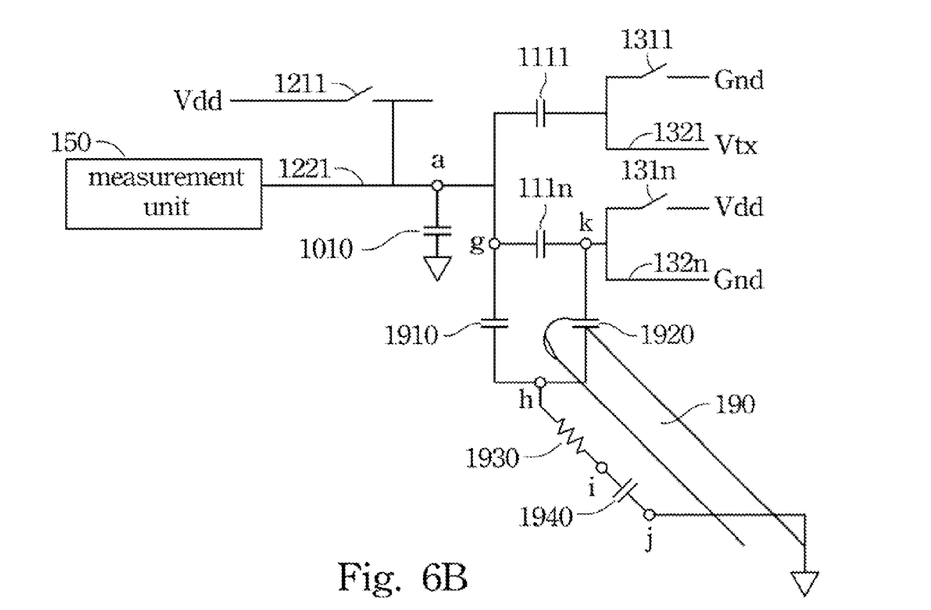
FIG. 6B is a fragmentary equivalent circuit diagram of the touch sensing apparatus of charge distribution type which is set in the second switching mode when the object touches the sensing regions that are not scanned of the first embodiment.

FIG. 6A and FIG. 6B are a fragmentary equivalent circuit diagrams of the touch sensing apparatus 100 which is set in the first and second switching mode when the object 190 touches the sensing regions 1012-1016 that are not scanned in the first embodiment. When the object 190 is in contact with or close to the sensing regions 1012-1016 that are not scanned, several sensing paths are formed between the object 190 and the panel 1000, the charge injection and the charge distribution are similar to that in FIG. 5A and FIG. 5B, and thus are not described herein again. Therefore, after the charges are distributed at the equilibrium state, the equivalent voltage is less than the equivalent voltage when the object 190 does not touch the sensing regions 1012-1016.

In a second embodiment of the present disclosure, the charges are injected into and distributed in the panel 1000 in a second charge distribution mode according to the scanning signal. At that moment, the first axial scanning unit 170 may output the first axial scanning signal to provide the low level voltage Gnd to the switch 1211. The second axial scanning unit 180 may output the second scanning signal to provide the predetermined level voltage Vtx to the switch 1311, to provide the high level voltage Vdd to the equivalent switch 132n and to provide the low level voltage Gnd for the switch 1321 and the equivalent switch 131n.

Figure 7A:
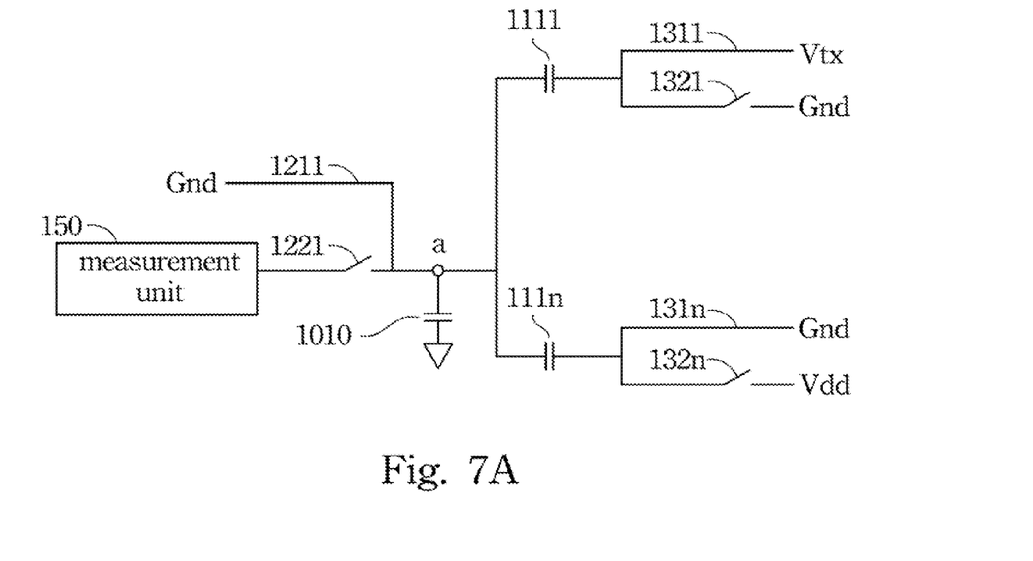
FIG. 7A is a fragmentary equivalent circuit diagram of the touch sensing apparatus of charge distribution type which is set in the first switching mode of the second embodiment.

FIG. 7A is a fragmentary equivalent circuit diagram of the touch sensing apparatus of charge distribution type which is set in the first switching mode in the second embodiment. The scanning of the sensing region 1011 of the panel 1000 is taken as an example for illustration in accompany with FIG. 7A. When the panel 1000 is set in the first switching mode, the first switch group is set at the ON state, i.e., the switch 1211, the switch 1311 and the equivalent switch 131n are turned on, and the second switch group is set at the OFF state, i.e., the switch 1221, the switch 1321 and the equivalent switch 132n are turned off. Therefore, the predetermined level voltage Vtx can be transferred through the switch 1311 to the sensing capacitor 1111 of the scanned sensing region 1011, such that the charges are injected into and stored in the sensing capacitor 1111.

Figure 7B:
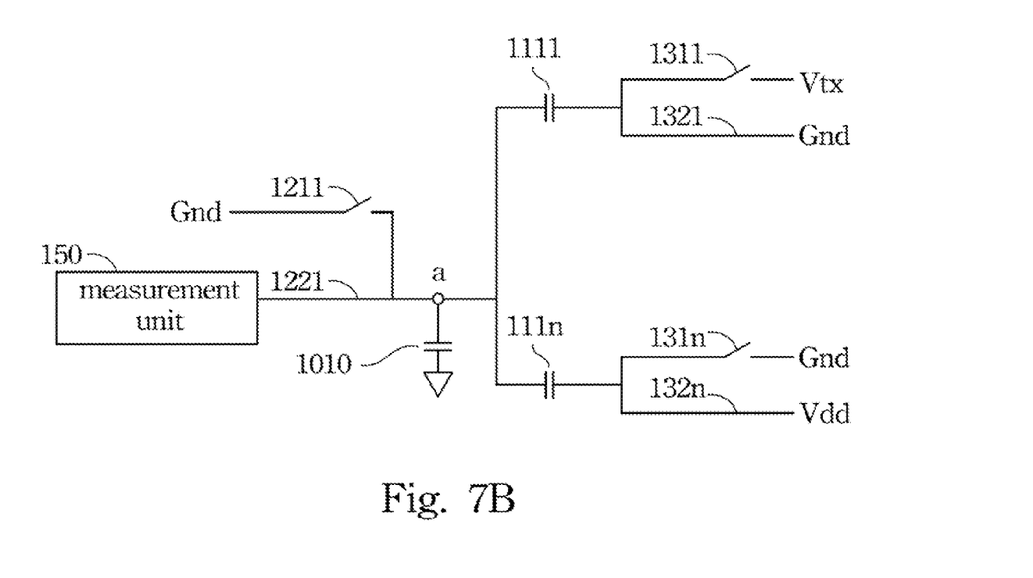
FIG. 7B is a fragmentary equivalent circuit diagram of the touch sensing apparatus of charge distribution type which is set in the second switching mode of the second embodiment.

FIG. 7B is a fragmentary equivalent circuit diagram of the touch sensing apparatus of charge distribution type which is set in the second switching mode in the second embodiment. When the panel 1000 is set in the second switching mode, the first switch group is set at the OFF state, i.e., the switch 1211, the switch 1311 and the equivalent switch 131n are turned off, the second switch group is set at the ON state, i.e., the switch 1221, the switch 1321 and the equivalent switch 132n are turned on. Therefore, the charges originally stored in the sensing capacitor 1111 are redistributed in the sensing capacitor 1111, the equivalent parasitic capacitor 1010 of the panel 1000 and the equivalent sensing capacitor 111n of the sensing regions that are not scanned (e.g., the sensing regions 1012-1016), and the equivalent voltage may be acquired by the measurement unit 150 after the charges are distributed at the equilibrium state. The equivalent voltage can be calculated by the following formula:

$$V = \frac{Vdd * Cpn - Vtx * Cptx}{Cx1 + Cpn + Cptx},$$

where the V is the equivalent voltage; Cx1 is the capacitance of the equivalent parasitic capacitor 1010; Vtx is the predetermined level voltage; Cptx is the capacitance of the sensing capacitor 1111; and Cpn is the capacitance of the equivalent sensing capacitor 111*n*.

In this embodiment, when the object (e.g., a finger) is in contact with or close to the panel 1000, the electrical field near the panel 1000 is changed to produce many sensing paths, such that the charges are redistributed, thus resulting in the variation of the equivalent voltage. The manner of calculating the equivalent voltage is similar to that described in the first embodiment and is thus not described herein again.

In a third embodiment of the present disclosure, the charges are injected into and distributed in the panel 1000 in the second charge distribution mode according to the scanning signal. At that moment, the first axial scanning unit 170 may output the first axial scanning signal to provide the low level voltage Gnd to the switch 1211. The second axial scanning unit 180 may output the second scanning signal to provide the low level voltage Gnd to the switch 1311, to provide the high level voltage Vdd to the equivalent switch 131*n* and the equivalent switch 132*n* and to provide the predetermined level voltage Vtx to the switch 1321.

Figure 8A:
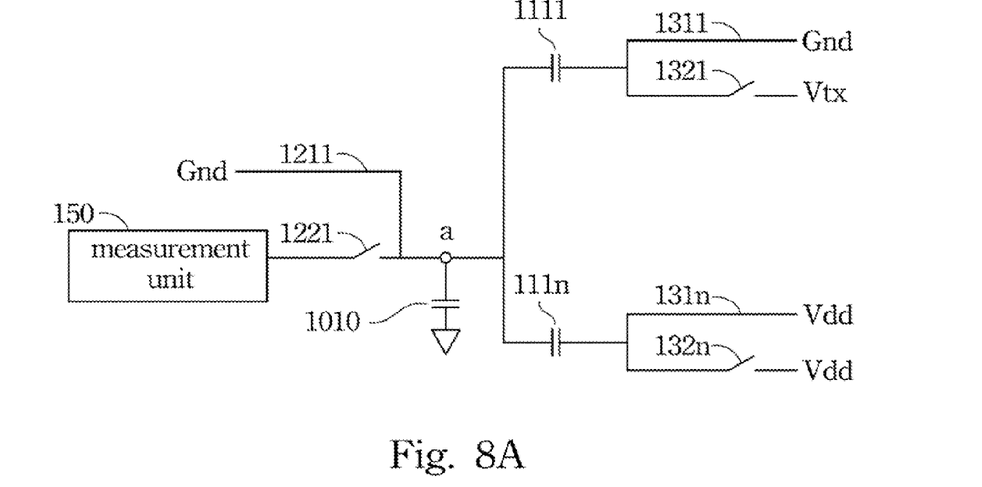
FIG. 8A is a fragmentary equivalent circuit diagram of the touch sensing apparatus of charge distribution type which is set in the first switching mode of the third embodiment.

FIG. 8A is a fragmentary equivalent circuit diagram of the touch sensing apparatus of charge distribution type which is set in the first switching mode in the third embodiment. The scanning of the sensing region 1011 of the panel 1000 is taken as an example for illustration in accompany with FIG. 8A. When the panel 1000 is set in the first switching mode, the first switch group is set at the ON state, i.e., the switch 1211, the switch 1311 and the equivalent switch 131*n* are turned on, and the second switch group is set at the OFF state, i.e., the switch 1221, the switch 1321 and the equivalent switch 132*n* are turned off. Therefore, the high level voltage Vdd can be transferred through the equivalent switch 131*n* to the equivalent sensing capacitor 111*n* of the sensing regions 1012-1016 that are not scanned, such that the charges are injected into and stored in the equivalent sensing capacitor 111*n*.

Figure 8B:
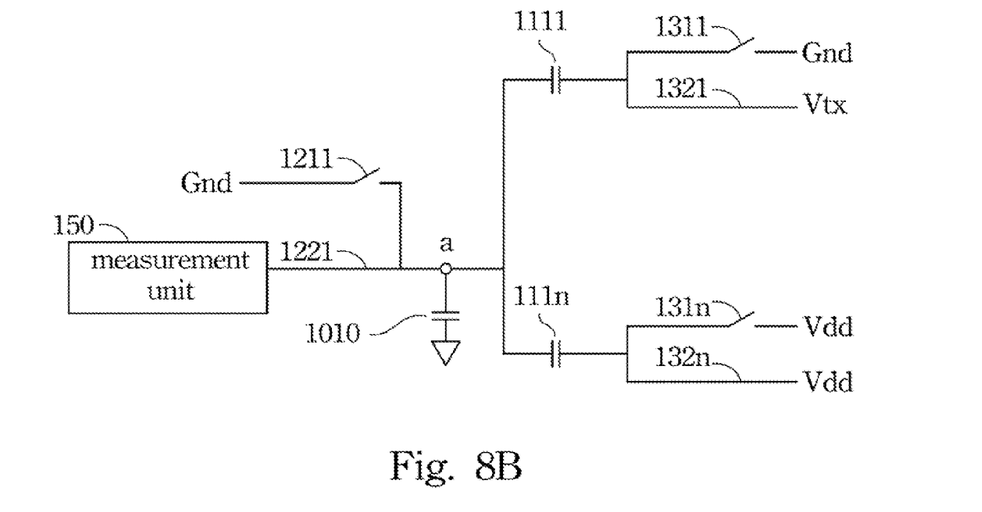
FIG. 8B is a fragmentary equivalent circuit diagram of the touch sensing apparatus of charge distribution type which is set in the second switching mode of the third embodiment.

FIG. 8B is a fragmentary equivalent circuit diagram of the sensing apparatus of charge distribution type which is set in the second switching mode in the third embodiment. When the panel 1000 is set in the second switching mode, the first switch group is set at the OFF state, i.e., the switch 1211, the switch 1311 and the equivalent switch 131*n* are turned off, and the second switch group is set at the ON state, i.e., the switch 1221, the switch 1321 and the equivalent switch 132*n* are turned on. Therefore, the charges originally stored in the equivalent sensing capacitor 111*n* are redistributed in the sensing capacitor 1111 of the scanned sensing region 1011, the equivalent parasitic capacitor 1010 of the panel 1000 and the equivalent sensing capacitor 111*n*, and the equivalent voltage may be acquired by the measurement unit 150 after the charges are distributed at the equilibrium state. The manner of calculating the equivalent voltage is similar to that described in the second embodiment and is thus not described herein again.

In a fourth embodiment of the present disclosure, the charges are injected into and distributed in the panel 1000 in the second charge distribution mode according to the scanning signal. At that moment, the first axial scanning unit 170 may output the first axial scanning signal to provide the low level voltage Gnd to the switch 1211. The second axial scanning unit 180 may output the second scanning signal to provide the low level voltage Gnd to the switch 1311, the equivalent switch 131*n* and the equivalent switch 132*n* and to provide the predetermined level voltage Vtx to the switch 1321.

Figure 9A:
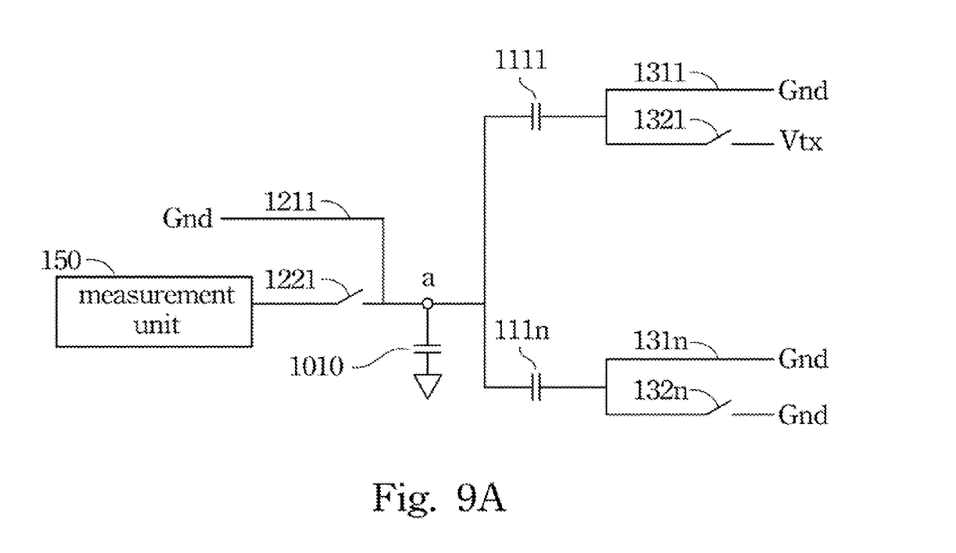
FIG. 9A is a fragmentary equivalent circuit diagram of the touch sensing apparatus of charge distribution type which is set in the first switching mode of the fourth embodiment.

FIG. 9A is a fragmentary equivalent circuit diagram of the touch sensing apparatus of charge distribution type which is set in the first switching mode in the fourth embodiment. The scanning of the sensing region 1011 of the panel 1000 is taken as an example for illustration in accompany with FIG. 9A. When the panel 1000 is set in the first switching mode, the first switch group is set at the ON state, i.e., the switch 1211, the switch 1311 and the equivalent switch 131*n* are turned on, and the second switch group is set at the OFF state, i.e., the switch 1221, the switch 1321 and the equivalent switch 132*n* are turned off. Therefore, the charges in the sensing capacitor 1111 of the scanned region 1011, the equivalent parasitic capacitor 1010 of the panel 1000 and the equivalent sensing capacitor 111*n* of the sensing regions 1012-1016 that are not scanned, are removed according to the low level voltage Gnd, i.e., the equivalent sensing capacitor 111*n* of the sensing regions 1012-1016 that are not scanned is charged to the low level voltage Gnd or a zero voltage level.

Figure 9B:
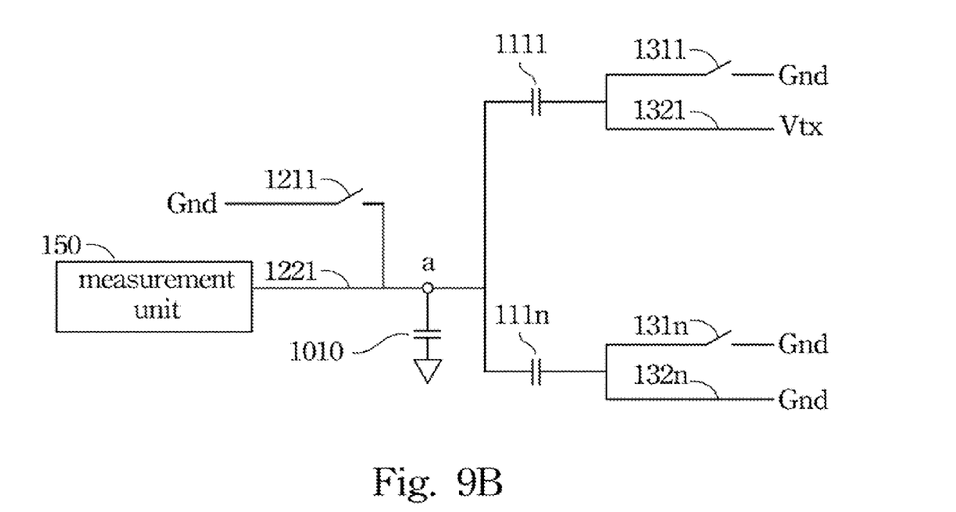
FIG. 9B is a fragmentary equivalent circuit diagram of the touch sensing apparatus of charge distribution type which is set in the second switching mode of the fourth embodiment.

FIG. 9B is a fragmentary equivalent circuit diagram of the touch sensing apparatus of charge distribution type which is set in the second switching mode in the fourth embodiment. When the panel 1000 is set in the second switching mode, the first switch group is set at the OFF state, i.e., the switch 1211, the switch 1311 and the equivalent switch 131*n* are turned off, and the second switch group is set at the ON state, i.e., the switch 1221, the switch 1321 and the equivalent switch 132*n* are turned on. Therefore, the second axial scanning unit 180 may output the second axial scanning signal to provide the predetermined level voltage Vtx for the switch 1321, such that the charges are injected into and distributed in the sensing capacitor 1111, the equivalent parasitic capacitor 1010 and the equivalent sensing capacitor 111*n*, and the equivalent voltage may be acquired by the measurement unit 150 after the charges are distributed at the equilibrium state. The manner of calculating the equivalent voltage is similar to that described in the second embodiment and is thus not described herein.

Therefore, regardless of the panel 1000 operating in the first charge distribution mode or in the second charge distribution mode, when the object 190 is in contact with or close to the panel 1000, the charges are redistributed, thus resulting in the variation of the measured equivalent voltage for the determination of the touched sensing region. Illustratively, in the present disclosure, the first charge distribution mode may be also referred to as a positive charge distribution (PCD) mode, and the second charge distribution mode may be also referred to as a negative charge distribution (NCD) mode. Additionally, the sensing capacitor, the equivalent sensing capacitor, the equivalent parasitic capacitor, the external sensing capacitor and the object equivalent capacitor, which are described in the foregoing embodiments corresponding to the diagrams, are not limited to physical capacitors; that is, they are merely used for illustrating the operations, and the present disclosure are not limited by these capacitors.

In conclusion, in the above embodiments of the present disclosure, the touch sensing apparatus alternately performs the charge infection and charge distribution, and the equivalent voltage is acquired after the charges are distributed at the equilibrium state. Since the sensing method in the present disclosure can be used to obtain the voltage distribution of the entire panel to determine the region touched by or close to the object according to the measurement of the equivalent voltage, without an additional high precision capacitor, the embodiments of the present disclosure have the advantages such as uncomplicated circuit, low cost, etc.

Furthermore, for the present disclosure, the operation precision does not depend on the absolute value of the capacitance, so the same integrated circuit design may be applied to the touch panel in touch devices (in which the touch panel may be adhered to or combined in other ways with the display panel or other elements to construct the touch device) or directly disposed in the display panel or on the surface of the display panel. In general, when the touch sensing circuit is directly disposed in the display panel or on the surface of the display panel, the cost is lower but the applied capacitor should have a larger absolute sensing capacitance value. Since for the present disclosure, the operation precision does not depend on the absolute value of the capacitance, it is not necessary to additionally provide and adjust a large capacitance when the touch sensing circuit is directly disposed in the display panel or on the surface of the display panel, no matter whether the foregoing embodiments are applied in touch panels or directly disposed in the display panel or on the surface of the display panel, and thus categories and items of touch devices can be simplified.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A touch sensing method of charge distribution type, comprising:
    removing charges in a panel;
    providing a scanning signal to scan a plurality of sensing regions on the panel;
    setting the panel in a first switching mode for charging the panel with the scanning signal;
    setting the panel in a second switching mode for modifying distribution of charges injected into the panel;
    acquiring an equivalent voltage after the injected charges are distributed at an equilibrium state;
    determining whether the step of scanning the sensing regions of the panel is completed so as to decide whether the acquired equivalent voltage is determined;
    when the step of scanning the sensing regions is completed, determining whether an object is in contact with or close to the panel according to a variation of the equivalent voltage; and
    when the step of scanning the sensing region is not completed, performing a scanning process for a next sensing region of the sensing regions,
    wherein when the object is in contact with or close to the panel, a plurality of sensing paths are formed between the object and the panel such that the charges are redistributed, thus resulting in the variation of the equivalent voltage.

2. The touch sensing method of claim 1 wherein the scanning signal comprises a plurality of voltage levels.

3. The touch sensing method of claim 2, wherein charges are injected into and distributed in the panel in a positive charge distribution mode according to the scanning signal.

4. The touch sensing method of claim 3, wherein when the panel is set in the first switching mode, charges are injected into a sensing capacitor of the scanned sensing regions and an equivalent parasitic capacitor of the panel according to the scanning signal.

5. The touch sensing method of claim 4, wherein when the panel is set in the second switching mode, the charges injected into the sensing capacitor and the equivalent parasitic capacitor are redistributed in the sensing capacitor, the equivalent parasitic capacitor and an equivalent sensing capacitor of the sensing regions that are not scanned.

6. The touch sensing method of claim 2, wherein charges are injected into and distributed in the panel in a negative charge distribution mode according to the scanning signal.

7. The touch sensing method of claim 6, wherein when the panel is set in the first switching mode, charges are injected into a sensing capacitor of the scanned sensing region according to the scanning signal.

8. The touch sensing method of claim 7, wherein when the panel is set in the second switching mode, the charges injected in the sensing capacitor are redistributed in the sensing capacitor, an equivalent parasitic capacitor of the panel and an equivalent sensing capacitor of the sensing regions that are not scanned.

9. The touch sensing method of claim 6, wherein when the panel is set in the first switching mode, the injected charges are injected into an equivalent sensing capacitor of the sensing regions that are not scanned according to the scanning signal.

10. The touch sensing method of claim 9, wherein when the panel is set in the second switching mode, the charges injected in the equivalent sensing capacitor are redistributed in a sensing capacitor of the scanned sensing region, an equivalent parasitic capacitor of the panel and the equivalent sensing capacitor.

11. The touch sensing method of claim 6, wherein when the panel is set in the first switching mode, all of the charges in a sensing capacitor of the scanned sensing regions, an equivalent parasitic capacitor of the panel and an equivalent sensing capacitor of the sensing regions that are not scanned, are removed according to the scanning signal.

12. The touch sensing method of claim 11, wherein when the panel is set in the second switching mode, charges are injected and distributed in the sensing capacitor, the equivalent parasitic capacitor and the equivalent sensing capacitor with the scanning signal.

13. The touch sensing method with charge distribution of claim 1, wherein the step of setting the panel in the first switching mode for charging the panel according to the scanning signal further comprises:
    charging a sensing capacitor of the scanned sensing regions, an equivalent parasitic capacitor of the panel and an equivalent sensing capacitor of the sensing regions that are not scanned to a relatively low voltage level or a zero voltage level.

14. A touch sensing apparatus of charge distribution type, comprising:
    a plurality of first axial electrodes disposed in a panel;
    a plurality of second axial electrodes disposed in the panel, the second axial electrodes interlaced or interleaved with the first axial electrodes to form a plurality of sensing regions;

a first axial switch unit electrically coupled with the first axial electrodes;

a second axial switch unit electrically coupled with the second axial electrodes;

a switch control unit which is electrically coupled between the first axial switch unit and the second axial switch unit and is configured to control switching modes of the first axial switch unit and the second axial switch unit such that charges are injected into and distributed in the panel according to a scanning signal;

a measurement unit electrically coupled with the first axial switch unit to acquire an equivalent voltage after the charges are distributed at an equilibrium state; and a processing unit which is electrically coupled with the measurement unit and the switch control unit and is configured to determine whether an object is in contact with or close to the panel according to a variation of the equivalent voltage acquired by the measurement unit, wherein the scanning signal comprises a plurality of voltage levels, the charges are injected into and distributed in the panel in a negative charge distribution mode according to the scanning signal, and when the panel is set in a first switching mode, the injected charges are injected into an equivalent sensing capacitor of the sensing regions that are not scanned according to the scanning signal; when the panel is set in the second switching mode, the charges injected in the equivalent sensing capacitor are redistributed in a sensing capacitor of the scanned sensing region, an equivalent parasitic capacitor of the panel and the equivalent sensing capacitor.

15. The touch sensing apparatus of claim 14, wherein the panel is a touch panel, and the first axial electrodes are disposed on an outer or inner surface of a glass substrate of the touch panel, and the second axial electrodes are disposed on the outer or inner surface of the glass substrate of the touch panel.

16. The touch sensing apparatus of claim 14, wherein the panel is a display panel, and the first axial electrodes are located in the display panel or on a surface of the display panel, and the second axial electrodes are located in the display panel or on the surface of the display panel.

17. A touch sensing method of charge distribution type, comprising:

removing charges in a panel;

providing a scanning signal to scan a plurality of sensing regions on the panel;

setting the panel in a first switching mode for charging the panel with the scanning signal;

setting the panel in a second switching mode for modifying a distribution of charges injected into the panel; and acquiring an equivalent voltage after the injected charges are distributed at an equilibrium state, wherein the scanning signal comprises a plurality of voltage levels, charges are injected into and distributed in the panel in a negative charge distribution mode according to the scanning signal, and when the panel is set in the first switching mode, charges are injected into a sensing capacitor of the scanned sensing region according to the scanning signal; when the panel is set in the second switching mode, the charges injected in the sensing capacitor are redistributed in the sensing capacitor, an equivalent parasitic capacitor of the panel and an equivalent sensing capacitor of the sensing regions that are not scanned.

* * * * *